(12) United States Patent
Knight

(10) Patent No.: US 8,132,848 B1
(45) Date of Patent: Mar. 13, 2012

(54) VEHICLE MOUNTED BRUSH FOR FOOTWEAR

(76) Inventor: Samuel Knight, Pensacola, FL (US)

( * ) Notice: Subject to any disclaimer, the term of this patent is extended or adjusted under 35 U.S.C. 154(b) by 131 days.

(21) Appl. No.: 12/799,966

(22) Filed: May 6, 2010

(51) Int. Cl.
*B60R 3/04* (2006.01)
*A47L 23/00* (2006.01)

(52) U.S. Cl. .......................................... 296/152; 15/36

(58) Field of Classification Search ................. 296/152; 15/36, 161
See application file for complete search history.

(56) References Cited

U.S. PATENT DOCUMENTS

| | | |
|---|---|---|
| 1,017,096 A | 2/1912 | Sternberg |
| 1,196,453 A | 8/1916 | Hatfield |
| 1,526,233 A | 2/1925 | Rance, Sr. |
| 1,718,428 A | 6/1929 | McNulty |
| 1,946,578 A | 2/1934 | Glauber et al. |
| 2,677,553 A | 5/1954 | Miller |
| 2,755,102 A | 7/1956 | Gerdes |
| 2,818,594 A | 1/1958 | Dawkins |
| 2,857,173 A | 10/1958 | Benander |
| 2,979,340 A | 4/1961 | Morrissey |
| 3,097,388 A | 7/1963 | Gresko |
| 3,165,334 A | 1/1965 | Barrett |
| D212,778 S * | 11/1968 | Smith et al. .................... D32/4 |
| 3,659,303 A | 5/1972 | Schroder et al. |
| 3,740,072 A | 6/1973 | Veith |
| 4,190,919 A * | 3/1980 | Burford ............................. 15/4 |
| 4,280,244 A * | 7/1981 | Spirig ............................. 15/40 |
| 4,724,564 A * | 2/1988 | Fresh ............................. 15/36 |
| 4,819,984 A | 4/1989 | Wylie |
| 5,310,201 A | 5/1994 | Routh |
| D381,138 S | 7/1997 | Taylor |
| 5,839,144 A * | 11/1998 | Willner ............................ 15/36 |
| 6,032,313 A * | 3/2000 | Tsang ............................. 15/22.1 |
| 6,067,688 A * | 5/2000 | West .............................. 15/311 |
| 6,301,739 B1 | 10/2001 | Cazaux |
| 6,363,567 B1 | 4/2002 | Woodward |
| 6,912,752 B2 * | 7/2005 | Ferrari ............................. 15/36 |
| 7,234,191 B2 | 6/2007 | Finley |
| 7,513,519 B2 | 4/2009 | Sharpe |
| 7,930,789 B2 * | 4/2011 | Hollander ......................... 15/36 |
| 2002/0029432 A1 * | 3/2002 | Graves et al. ................... 15/112 |
| 2007/0186359 A1 | 8/2007 | Rattray |
| 2008/0289127 A1 * | 11/2008 | Guy et al. ........................ 15/36 |

* cited by examiner

*Primary Examiner* — H Gutman
(74) *Attorney, Agent, or Firm* — Peter Loffler

(57) ABSTRACT

A cleaning system is attached to a door pocket of a vehicle and allows, via a spinning brush head, to clean the outer surfaces of a person's footwear prior to stepping into the vehicle. The system uses a brush that has a handle and a rotating brush head powered by a motor within the handle. The handle is attached, via a clip or similar system, to the door pocket. The motor is powered either via a battery within the handle or via the vehicle's battery and is controlled either via a switch on the handle or via the door depression switch that detects whether the door of the vehicle is open or closed, or both.

20 Claims, 5 Drawing Sheets

VEHICLE MOUNTED BRUSH FOR FOOTWEAR

BACKGROUND OF THE INVENTION

1. Field of the Invention

The present invention relates to a brush that is attached to an interior surface within a vehicle in order to allow a person to be able to brush off his or her footwear prior to stepping into the vehicle.

2. Background of the Prior Art

For many people, a vehicle is the second largest investment they make, next to their homes. As a result, many vehicle owners take great pride in maintaining and caring for the vehicle in order to keep the vehicle in good running order as well as clean and tidy. One area of vehicle maintenance that provides a challenge to owners is the carpeting. The normal process of walking around outside causes dirt and mud to accumulate on a person's footwear. When the person steps into the vehicle, this dirt and mud comes off of the footwear and gets deposited on the interior carpeting of the vehicle. Many vehicle owners shake or otherwise bump their shoes prior to vehicle entry, however, such cleaning processes tend not to eliminate all of the accumulated dirt and mud, especially with modern intricately creviced shoe sole designs. Accordingly, some of the dirt and mud is brought into the vehicle which requires removal therefrom, typically via a vacuuming process. While regular vacuuming removes a substantial portion of such dirt and mud, vacuuming is a time-consuming and labor-intensive process so that vehicle owners perform such a task with less frequency than is called for by dirt and mud accumulation. Nevertheless, even with very frequent vacuuming, some of the dirt and mud gets ground into the carpeting such that this ground in dirt is removed, if possible, via shampooing or other intense cleaning method, which is more expensive and additionally time-consuming.

Devices have been proposed that help remove dirt and mud from the footwear of vehicle occupants, however, such devices have certain shortcomings. Many such prior art devices are in the form of scrapers that scrape the sole of a shoe or boot. Such scrapers are effective for removal of dirt and mud from the soles of shoes and boots that have generally smooth soles, but tend to be ineffective in removal of dirt and mud from soles that are patterned as well as from other parts of the boot or shoe. Additionally, many such devices are designed to be mounted on the running board of a vehicle, which running boards have fallen out of fashion on many vehicles over the decades.

To address these problems, footwear brushing systems have been proposed that brush footwear on both the sole of the footwear as well as other parts of the footwear. Such brushing systems are also more effective in patterned soles of modern shoes. However, such brushing systems tend to be relatively complex in design and construction so as to make such systems economically impractical to many would-be consumers of such systems.

What is needed is a footwear cleaning system that overcomes the above stated shortcomings found in the art. Specifically, such a footwear cleaning system must be able to effectively clean most of the portions of the outerwear of footwear as well as soles that have other than smooth surfaces. Such a system must be relatively simple in design and construction so as to be readily affordable to potential consumers of such products. Such a system must not rely on the availability of a running board for installation.

SUMMARY OF THE INVENTION

The vehicle mounted brush for footwear of the present invention addresses the aforementioned needs in the art by providing a simple brushing system for footwear that is able to clean virtually all outer surfaces of footwear with relative ease including footwear that has a patterned or otherwise non-smooth sole surface. The vehicle mounted brush for footwear is easy to install, operate and maintain so as to be readily attractive, both financially and from a maintenance point of view, to potential consumers of such systems. The vehicle need not have a running board for installation of the vehicle mounted brush for footwear. The vehicle mounted brush for footwear is produced using standard manufacturing techniques.

The vehicle mounted brush for footwear of the present invention is comprised of a brush that has a handle, a motor disposed within the handle, and a brush head that rotates via operation of the motor. The handle is attached, removably or otherwise, to the door pocket of the vehicle. A switch activates and deactivates the motor such that the switch is either located on the handle or is the switch that is controlled by the door of the vehicle (the switch that turns the interior lights (and possibly other systems) of the vehicle on and off depending on whether the switch detects that the door of the vehicle is open or closed). A battery provides a source of electrical power for the motor which battery is either located within the handle or is the vehicle battery with the device hardwired into the vehicle's electrical system in appropriate fashion. A deflection plate is attached to the handle such that the deflection plate overlies a portion of the brush head so that the deflection plate prevents the brush head from throwing debris onto the vehicle's door. At least one clip is attached to the handle, either directly or via the deflection plate, such that the clip facilitates the attachment of the handle to the door pocket.

BRIEF DESCRIPTION OF THE DRAWINGS

Similar reference numerals refer to similar parts throughout the several views of the drawings.

DESCRIPTION OF THE PREFERRED EMBODIMENT

Figure 1:
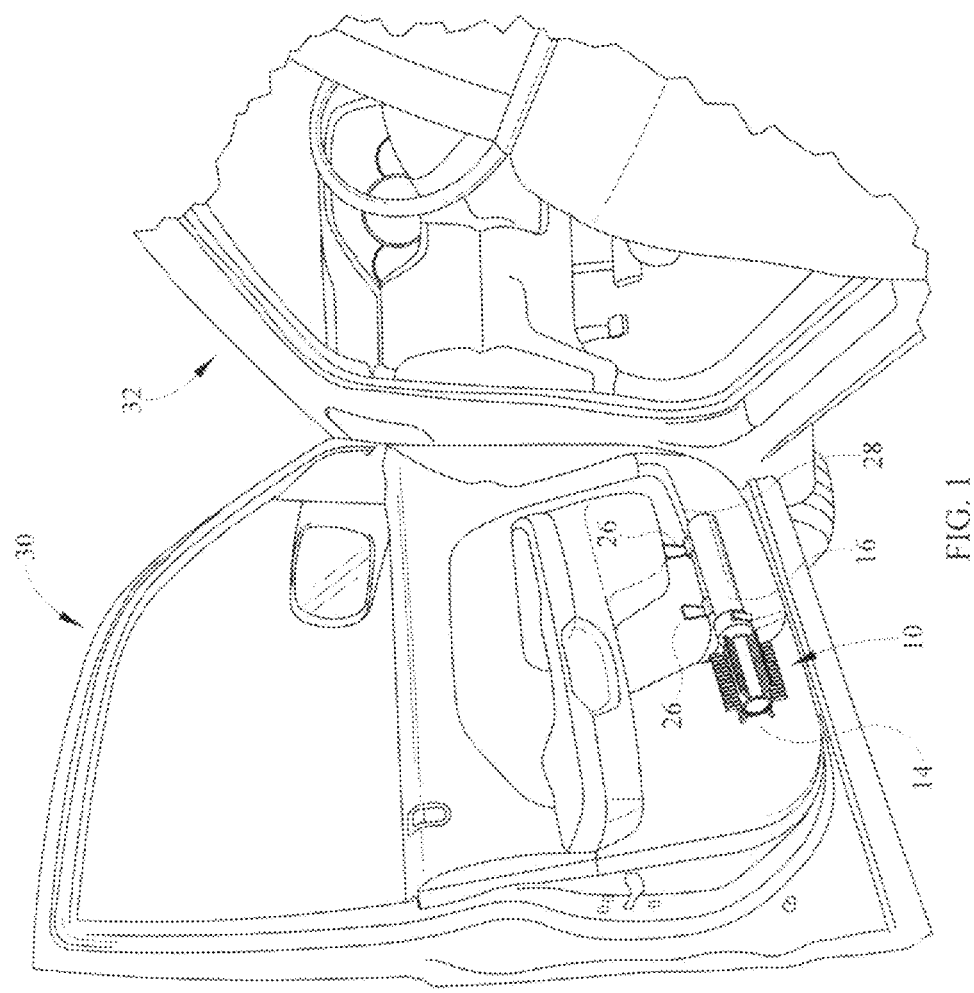
FIG. 1 is a perspective view of the vehicle mounted brush for footwear of the present invention installed within the vehicle.
Figure 2:
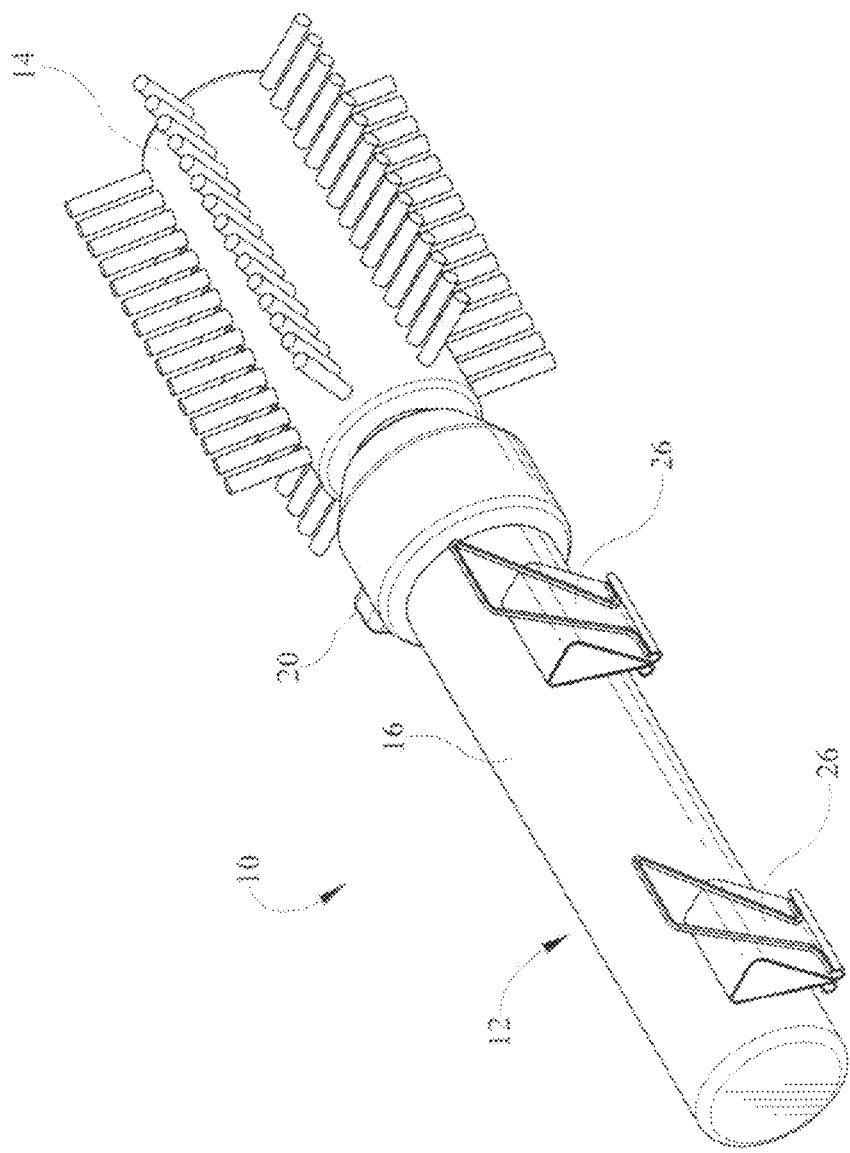
FIG. 2 is a perspective view of the vehicle mounted brush for footwear.
Figure 3:
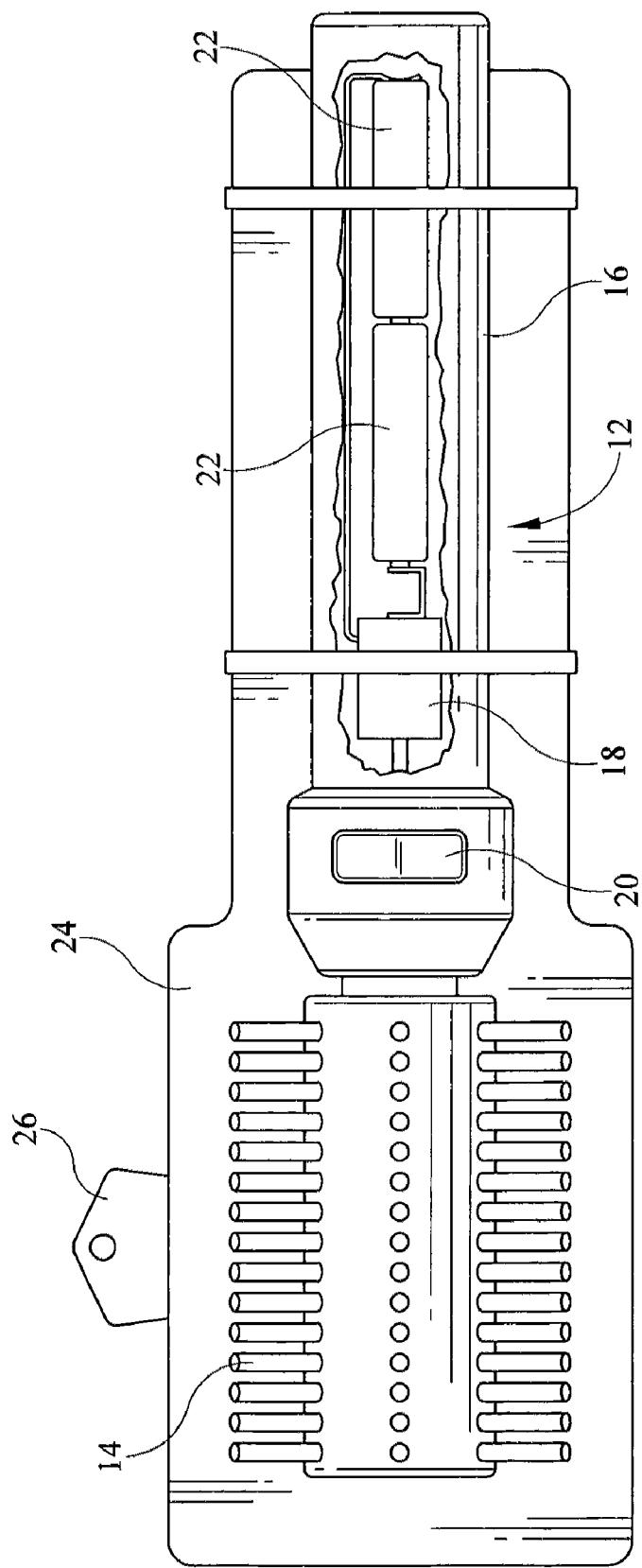
FIG. 3 is a side view of the vehicle mounted brush for footwear.
Figure 4:
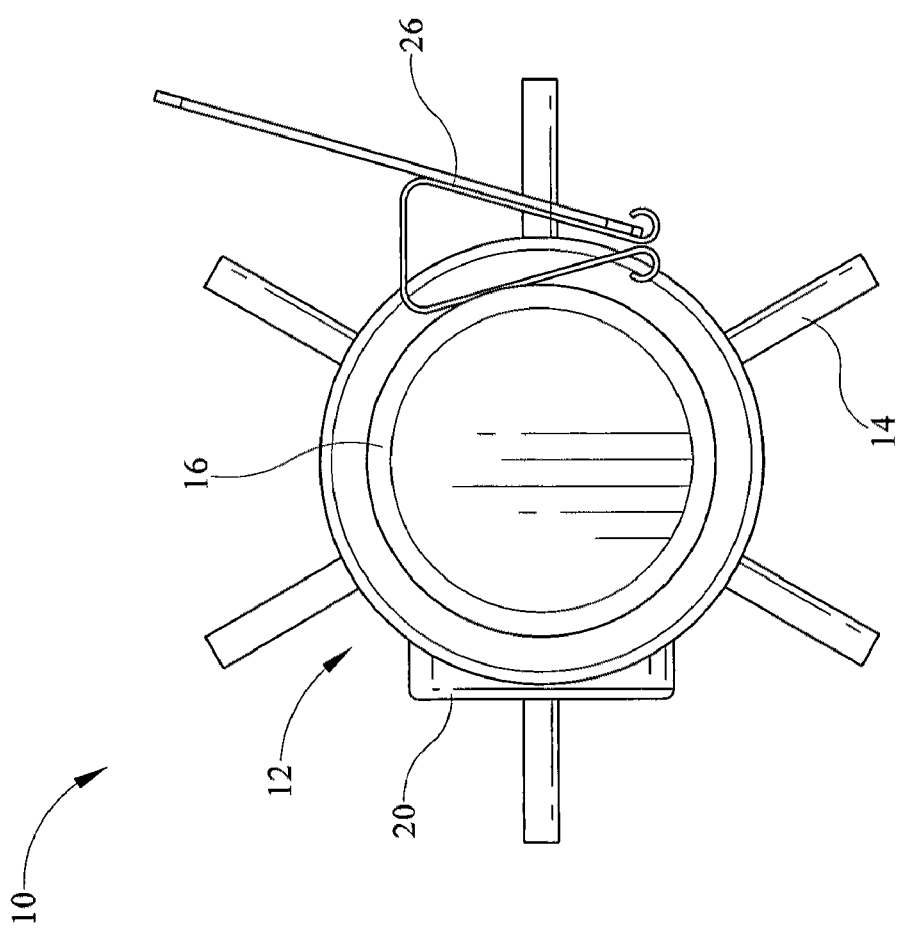
FIG. 4 is a front view of the vehicle mounted brush for footwear.
Figure 5:
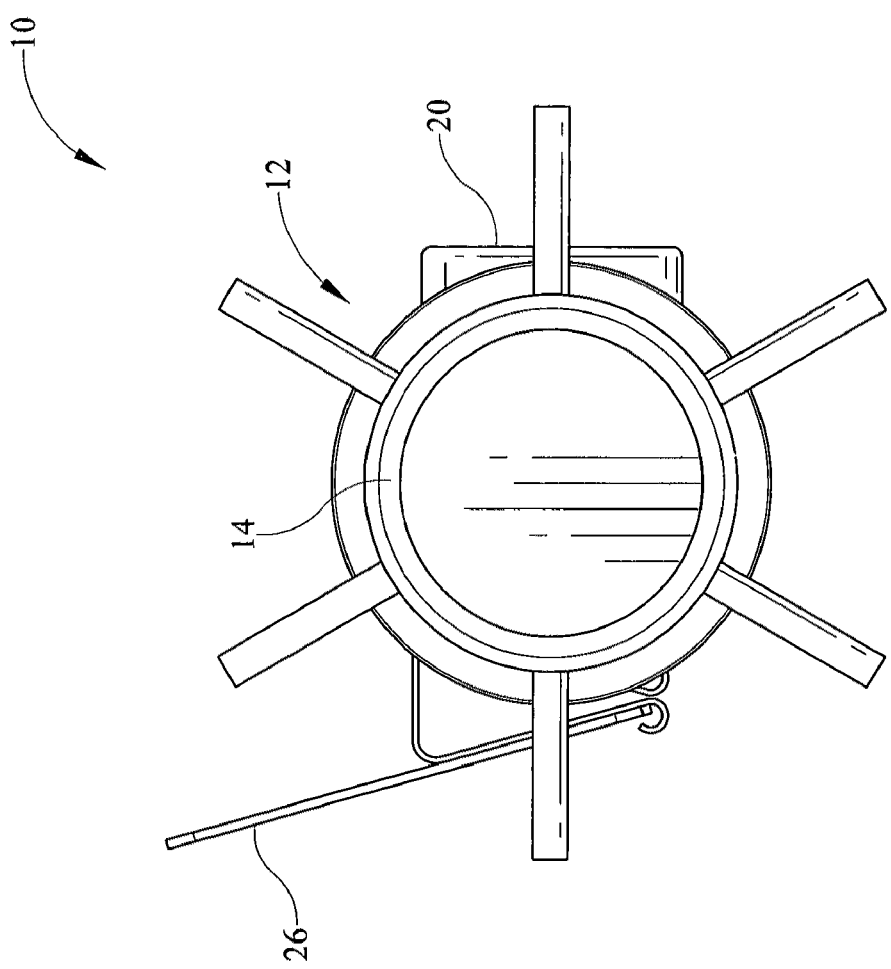
FIG. 5 is a rear view of the vehicle mounted brush for footwear.

Referring now to the drawings, it is seen that the vehicle mounted brush for footwear of the present invention, generally denoted by reference numeral 10, is comprised of a motorized brush 12 that has a rotating brush head 14 and a handle 16 having a motor 18 disposed therein for rotating the brush head 14. An on/off switch 20 controls operation of the motor 18. Batteries 22 provide electrical power for the motor 18. The vehicle mounted brush for footwear 10 is appropriately disassembleable in order to allow quick and orderly replacement of the batteries 22. A deflection plate 24 is attached to the handle 16. One or more clips 26, spring-loaded or otherwise, are attached to the handle 16 or to the deflection plate 24 in any appropriate fashion such as via adhesion, being screwed thereonto, etc. The clips 26 are used to removably attach the vehicle mounted brush for footwear 10 to a door pocket 28 of a door 30 of a vehicle 32, such door pockets 28 being a common facility on many modern vehicles. The vehicle mounted brush for footwear 10 is mounted in such fashion so that the brush head 14 is located away from the pocket 28 so that any debris removed by the vehicle mounted brush for footwear 10 does not fall into the pocket 28. The deflection plate 24 prevents the debris from hitting the door 30.

In order to use the vehicle mounted brush for footwear 10 of the present invention, the brush 12 is mounted to the pocket 28. When a user opens the vehicle's door 30, the motor 18 is activated via the switch 20 in order to rotate the bush head 14 in response to motor 18 operation. The user places his or her footwear against the rotating brush head 14 in order for the brush head 14 to dislodge and remove any dirt and mud that has accumulated on the footwear. As the vehicle door 30 is open, the brush head 14 is located over the ground surface so that any removed debris falls to the ground surface and not into the vehicle 32. Once the footwear of the user is brushed off, the switch 20 is used to turn the motor 18 off. As the vehicle mounted brush for footwear 10 has a relatively small profile, once the door 30 of the vehicle 32 is closed, the device 10 does not interfere with the driver's ability to operate the vehicle 32. The vehicle mounted brush for footwear 10 may be placed onto doors of the vehicle 32 other than the driver's door 30 so that passengers may also clean their footwear prior to stepping into the vehicle 32.

Of course the brush 12 may be attached to the door pocket 28 other than via the illustrated clips 26 including via adhesion, screwing or bolting the device 10 to the pocket 28, the use of cooperating hook and loop material, etc.

The vehicle mounted brush for footwear 10 may be connected to the vehicle's electrical system, either via hardwiring or via the cigarette lighter adapter, so that the vehicle's battery provides the source of electrical power for the motor 18 (typically 12 volts DC) instead of the use of the illustrated batteries 22. Additionally, the vehicle mounted brush for footwear 10 can be further wired into the vehicle's electrical system, such as to the depression switch commonly found on vehicle doors 30 to control the interior lights of the vehicle 32 so that when the door 30 is opened, the motor 18 is automatically activated and when the door 30 is closed, the motor 18 is deactivated (or the motor 18 may be on a timer so that the motor 18 deactivates after a certain amount of time even if the door 30 of the vehicle 30 remains open). In such an embodiment, the illustrated switch 20 may be used to enable and disable motor 18 operation so that when operation is enabled, opening of the door 30 causes motor 18 activation and when the door 30 is closed, the motor 18 is deactivated. If operation is disabled, the motor 18 remains deactivated at all times.

While the invention has been particularly shown and described with reference to an embodiment thereof, it will be appreciated by those skilled in the art that various changes in form and detail may be made without departing from the spirit and scope of the invention.

I claim:

1. A cleaning system for attachment to a door pocket on a door of a vehicle, the cleaning system comprising a brush having a handle, a motor, and a brush head that rotates via operation of the motor such that the handle is adapted to be attached to the door pocket; the cleaning system further comprising a switch for activating and deactivating the motor such that the switch is controlled by the door of the vehicle.

2. The cleaning system as in claim 1 wherein a battery provides a source of electrical power for the motor.

3. The cleaning system as in claim 2 wherein the battery is located within the handle.

4. The cleaning system as in claim 2 wherein the battery is a vehicle battery.

5. The cleaning system as in claim 1 further comprising a clip attached to the handle such that the clip facilitates the attachment of the handle to the door pocket.

6. The cleaning system as in claim 1 further comprising a deflection plate attached to the handle which deflection plate overlies at least a portion of the brush head.

7. The cleaning system as in claim 6 further comprising a clip attached to either the handle or to the deflection plate such that the clip facilitates the attachment of the handle to the door pocket.

8. A cleaning system for attachment to a door pocket on a door of a vehicle, the cleaning system comprising a brush having a handle, a motor, and a brush head that rotates via operation of the motor such that the handle is adapted to be attached to the door pocket wherein a battery provides a source of electrical power for the motor, the battery being a vehicle battery.

9. The cleaning system as in claim 8 further comprising a switch for activating and deactivating the motor.

10. The cleaning system as in claim 9 wherein the switch is located on the handle.

11. The cleaning system as in claim 8 further comprising a clip attached to the handle such that the clip facilitates the attachment of the handle to the door pocket.

12. The cleaning system as in claim 8 further comprising a deflection plate attached to the handle which deflection plate overlies at least a portion of the brush head.

13. The cleaning system as in claim 12 further comprising a clip attached to either the handle or to the deflection plate such that the clip facilitates the attachment of the handle to the door pocket.

14. A cleaning system for attachment to a door pocket on a door of a vehicle, the cleaning system comprising a brush having a handle, a motor, and a brush head that rotates via operation of the motor such that the handle is adapted to be attached to the door pocket and such that a clip is attached to the handle such that the clip facilitates the attachment of the handle to the door pocket.

15. The cleaning system as in claim 14 further comprising a switch for activating and deactivating the motor.

16. The cleaning system as in claim 15 wherein the switch is located on the handle.

17. A cleaning system for attachment to a door pocket on a door of a vehicle, the cleaning system comprising a brush having a handle, a motor, and a brush head that rotates via operation of the motor such that the handle is adapted to be attached to the door pocket and such that a deflection plate is attached to the handle which deflection plate overlies at least a portion of the brush head.

18. The cleaning system as in claim 17 further comprising a switch for activating and deactivating the motor.

19. The cleaning system as in claim 18 wherein the switch is located on the handle.

20. The cleaning system as in claim 17 further comprising a clip attached to either the handle or to the deflection plate such that the clip facilitates the attachment of the handle to the door pocket.

* * * * *